June 2, 1959  F. J. LUPO  2,889,075
ROTARY DEVICE AND TORQUE TRANSMISSION MEANS THEREFOR
Filed May 27, 1954  3 Sheets-Sheet 1

INVENTOR.
FRITZ J. LUPO
BY
Barnes, Kisselle, Laughlin & Raisch
ATTORNEYS.

June 2, 1959            F. J. LUPO            2,889,075

ROTARY DEVICE AND TORQUE TRANSMISSION MEANS THEREFOR

Filed May 27, 1954            3 Sheets-Sheet 3

INVENTOR.
FRITZ J. LUPO
BY
Barnes, Kisselle, Laughlin & Raisch
ATTORNEYS.

United States Patent Office 2,889,075
Patented June 2, 1959

2,889,075

ROTARY DEVICE AND TORQUE TRANSMISSION MEANS THEREFOR

Fritz J. Lupo, Detroit, Mich., assignor to Feedmatic Incorporated, Detroit, Mich., a corporation of Michigan Application May 27, 1954, Serial No. 432,765

2 Claims. (Cl. 221—182)

This invention relates to a transmission structure for transmitting a predetermined amount of torque in a rotary device.

An exemplary application of the invention lies in a rotary hopper of the type used for aligning and feeding similarly shaped workpieces to a machine or the like. Such a hopper is usually powered by a standard electric motor which rotates at a relatively high speed and which, through speed reduction gearing, rotates the hopper body at a slow speed. The motor may rotate 100 to 200 times as fast as the hopper body. The mechanical advantage of the hopper body is so great that it may seriously damage or destroy itself or associated parts if its rotation is obstructed such as by a jamming of the workpieces therein.

It is a primary object of this invention to provide a simple, compact, inexpensive structure for transmitting only a predetermined amount of torque from a motor to a rotating member such as a hopper body so that the rotating member will remain undamaged should its rotation be obstructed. The invention is carried out generally by a concentric arrangement of a plural cone clutch and a drive shaft for the rotating member with a stack of lock washers forming a spring stressed by adjustable means for regulating the frictional engagement of the clutch cones. Another object of the invention is to provide a simple hopper body construction. One form of the invention is shown in the accompanying drawings which may be briefly described as follows:

Figure 1:
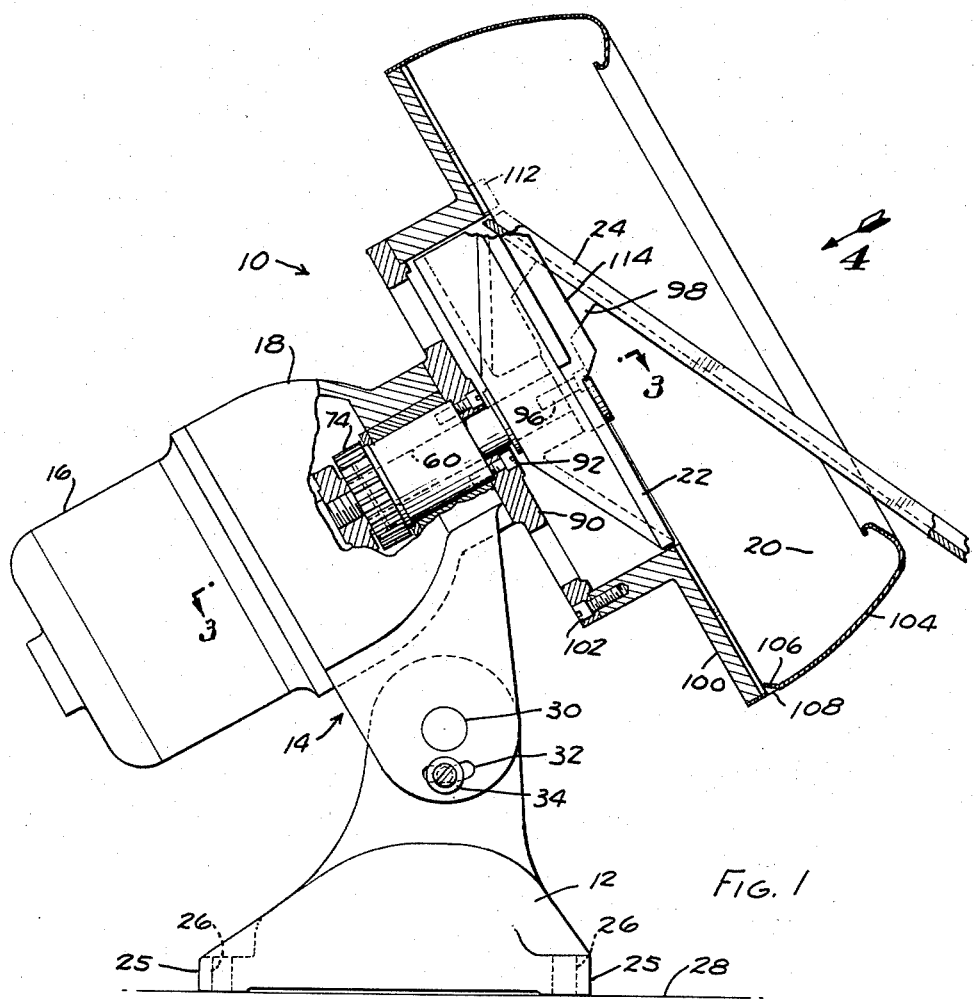
Fig. 1 is an elevational view of a rotary hopper embodying the device of this invention with some parts broken away and some parts shown in section.
Figure 2:
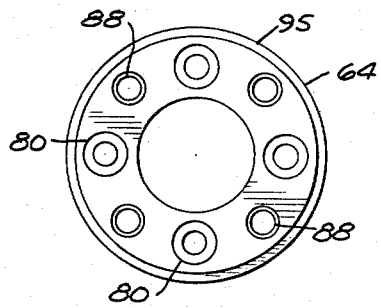
Fig. 2 is an end elevation of a drive shaft.

Shown in Fig. 1 is a rotary hopper 10 having a base 12 and a frame 14 supporting a standard type electric motor 16. The frame has a housing 18 for the reduction gearing and torque transmission means. A rotary hopper body 20 is mounted on frame 14. Mounted centrally within the hopper body is a stationary baffle plate 22. A stationary track or chute 24 is provided for receiving and conveying aligned workpieces from the hopper body. The base 12 is preferably provided with spaced apart feet 25 having bolt holes 26 for bolting the hopper on a supporting surface 28. Frame 14 is pivotally mounted on base 12 as shown at 30 and has arcuate slotted means 32 engaging a locking screw 34 on the base for selectively setting the angle of hopper body 20.

Motor 16 is secured to a transmission housing 18 by such means as bolts 36 and the motor shaft 38 is connected by a dowel pin 40 to a shaft 42 which is journalled within housing 18 and which drives the speed reduction gearing mechanism therein. An oil seal ring is shown at 44. A worm 46 on shaft 42 drives a worm gear 48 on shaft 50 journalled in housing 18. Mounted on shaft 50 is a second worm 52 engaging a second worm gear 54, which, through shaft 56 journalled in the housing, drives a pinion gear 58. Worms 46 and 52 and worm gears 48 and 54 may be identical. The mechanism preferably operates in an oil bath and preferably has a speed reduction factor of about 100.

Figure 3:
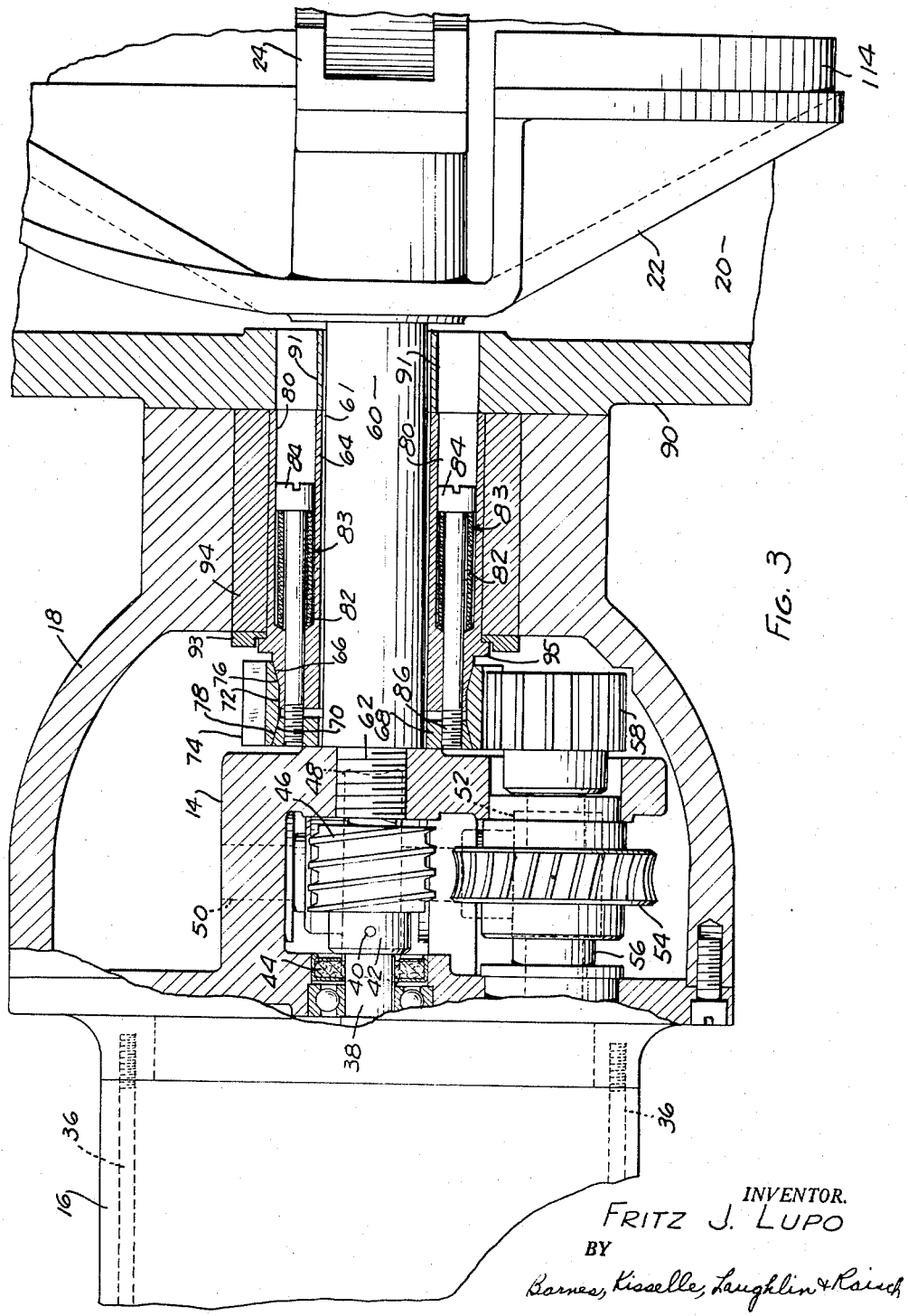
Fig. 3 is an enlarged generally sectional view on line 3—3 of Fig. 1.
Figure 4:
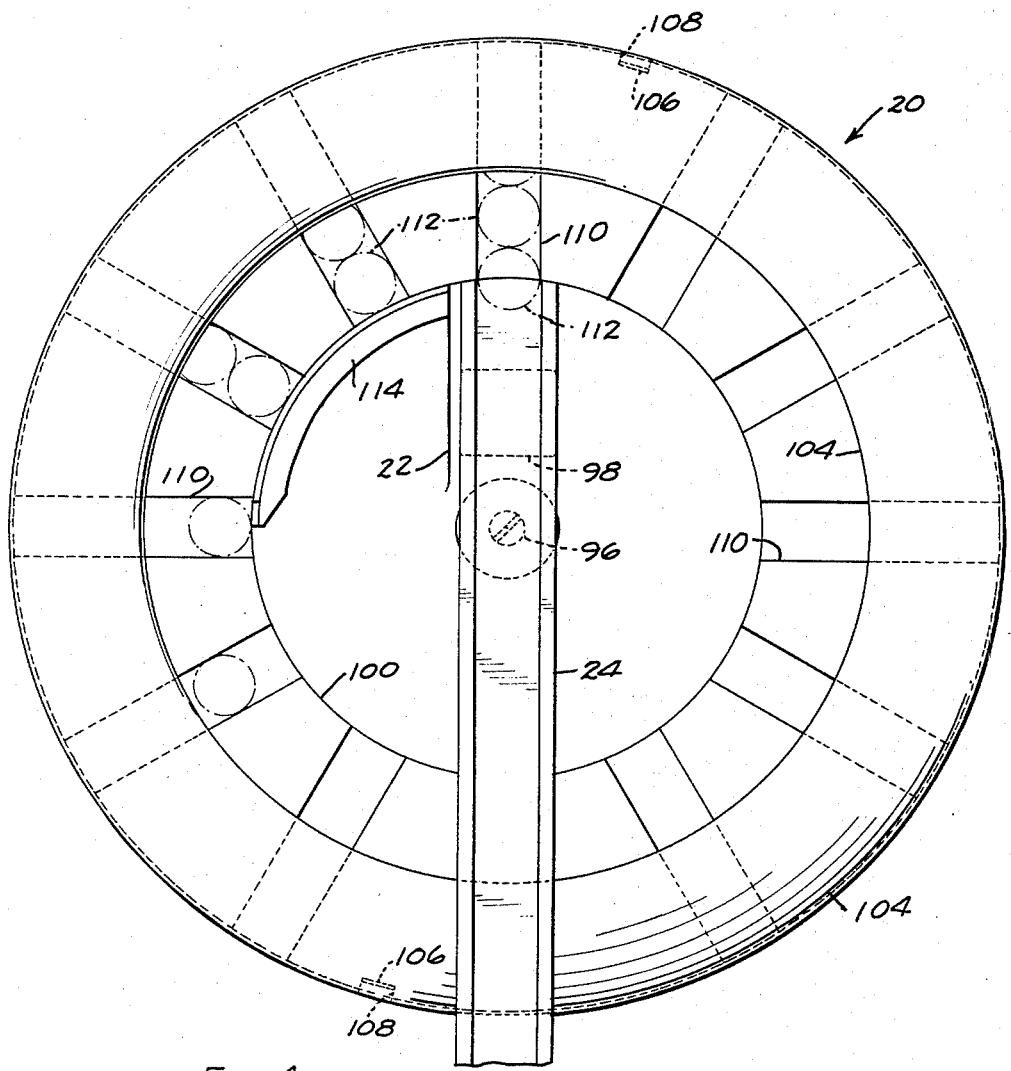
Fig. 4 is an elevational view looking in the direction of arrow 4 in Fig. 1.

A cylindrical post 60 is secured on frame 14 by such means as threads 62. A hollow cylindrical drive shaft 64 is disposed concentrically around post 60 and a clearance 61 is provided therebetween. One end portion of the shaft is tapered inwardly as best shown in Fig. 3 to provide a clutch cone 66. A clutch ring 68 fits rotatably around post 60 adjacent the inner end of drive shaft 64. Clutch ring 68 has a taper outer face providing another clutch cone 70. Cones 66 and 70 are angled oppositely to each other. A land 72 may be provided intermediate the cones. For convenience and simplicity of manufacture, land 72 may comprise an integral portion of shaft 64 or of ring 68 and ring 68 may comprise a severed portion of shaft 64.

A ring gear 74 is mounted concentrically with post 60, drive shaft 64 and clutch ring 68. The ring gear has tapered internal surfaces 76 and 78 which mate with cones 66 and 70, respectively. Ring gear 74 is dentally engaged by and is preferably larger than pinion gear 58 to provide an aggregate speed reduction factor of about 200.

Figure 5:
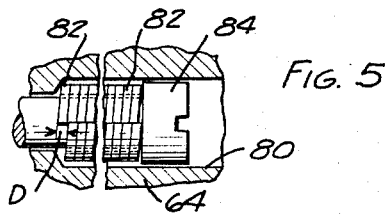
Fig. 5 is an enlarged sectional view illustrating the spring means for providing clutch friction.

Drive shaft 64 has a number of axial bores 80. Within each bore are a number of axially aligned, resilient, single convolution, helical elements 82 which may conveniently comprise split helical ring type lock washers. The lock washers have their split portions circumferentially aligned, Fig. 5, and form springs 83. An Allen cap screw 84 extends through each bore and through the aligned lock washers and is threaded into the clutch ring 68 as shown at 86. Drive shaft 64 is journalled in housing 18 through bearing 94 which may comprise a needle-roller bearing as shown. A thrust washer 93 is provided at the inner end of bearing 94 and shaft 64 may have an annular shoulder 95 for engaging the thrust washer.

Shaft 64 has a number of threaded openings 88 therein and is secured to a plate portion 90 of hopper body 20 by screws 92 threaded into openings 88, Fig. 1. Plate 90 has openings 91 therein for access to screws 84. Baffle 22 is secured to the outer end of post 60 by such means as a screw 96 and a mounting block 98 for track 24 is also mounted on post 60, preferably by screw 96. Thus the drive shaft supports the rotatable hopper body while the post supports the stationary baffle.

Hopper body 20 includes a collector ring 100 secured to driven plate 90 by such means as screws 102 and an annular shell or cover member 104 which fits around the periphery of the collector ring. The cover has relatively small struck-in portions 106 which engage the collector ring to locate the cover on the collector ring. Openings 108 are left by the struck-in portions for a purpose to be described. Collector ring 100 has a number of radially extending slots or recesses 110 formed by suitable means and dimensioned for engaging like portions of workpieces 112.

In use, before the hopper is set into operation screws 84 are tightened to urge clutch ring 68 and drive shaft 64 axially toward each other, thereby axially stressing lock washers 82 and establishing frictional engagement between cones 66 and 70 and taper faces 76 and 78 of gear 74. Each lock washer requires the application of a determinable amount of force to flatten it. The spring 83 formed by each series of lock washers requires the application of that amount of force times the number of lock washers used for complete stressing.

Thus, where a lock washer requires 25 to 30 pounds of force to completely flatten and where 22 lock washers are used as shown in Fig. 3, a total force of between 550 and 660 pounds is required to flatten all of the washers. Complete flattening of the washers in all four springs 83 will impart a total force of 2200 to 2640 pounds to the interengaging clutch cones. Lesser forces are obtained by tightening screws 84 to a lesser extent. The coefficient of friction between the interengaging clutch cones is known and the travel of screws 84 in flattening washers 82 is known. Hence, screws 84 may be tightened a determinable amount for the interengaging clutch cones to transmit a desired predetermined amount of torque.

The number of lock washers used in springs 83 may be varied. However, regardless of the number used, the axial movement D (Fig. 5) required of bolts 84 to completely flatten the springs will be the same as that required to flatten one washer. In a standard type lock washer, distance D is about 3/64 inch. Hence, for a relatively small axial adjustment of bolts 84 a relatively large variation is obtained in the frictional engagement of the clutch cones.

The angle of the hopper body 20 is adjusted properly for a given operation by shifting frame 14 on base 12 through pivot 30 and arcuate slot 32 and tightening the locking screw 34. When the clutch and hopper body have been adjusted and randomly aligned workpieces 112 placed in the hopper body, motor 16 is started. Motor 16 turns pinion gear 58 through the reduction gear mechanism described and the pinion gear drives ring gear 74. The internal taper surfaces 76 and 78 of the ring gear frictionally engage cones 66 and 70 through the force exerted by compressed lock washers 82, thereby rotating drive shaft 64 and plate element 90 of hopper body 20. Clearance 61 and needle bearing 94 minimize frictional resistance to rotation of shaft 64.

Workpieces 112 are tumbled by rotation of the hopper body and some of them align themselves within slots 110 and are carried upwardly. The workpieces are supported within slots 110 by a track 114 on baffle 22. Track 114 terminates adjacent the upper end of chute 24 so that when slots 110 are aligned with the chute, the workpieces therein slide into the chute gravitationally and are conveyed away from the hopper body in aligned relation for feeding into a machine or the like. Workpieces which miss the chute fall back to the bottom of the hopper body.

When workpieces become jammed, such as between portions of the baffle plate 22 and track or chute 24 so as to obstruct rotation of the hopper body, the clutch faces 66, 70, 76 and 78 merely slip on one another. Hence, rotation of the hopper body may be obstructed while motor 16 is still running without danger of destroying or seriously damaging the hopper body or the drive mechanism. When the obstruction has been removed, frictional engagement of the double cone clutch continues rotation of the hopper body.

To vary the amount of torque which the clutch will transmit before slipping, bolt 96 is removed and mounting block 98 and baffle 22 are lifted off of post 60, exposing access openings 91. A suitable tool may then be inserted through the access openings to turn screws 84 and thereby increase or decrease the compression of lock washers 82. If a greater range of adjustment is required, bolts 84 may be removed to increase or decrease the number lock washers comprising springs 83. After the adjustment has been made, baffle 22 and mounting block 98 with track 24 thereon are replaced on post 60 and bolt 96 screwed into place.

The hopper, baffle, and clutch and drive shaft mechanism are secured in assembled relation by bolts 92 and 96. Bolts 92 are exposed by removal of baffle 22 as described so that assembly and disassembly of the parts for maintenance or otherwise is very simple.

A certain amount of foreign matter in the form of dirt or metal particles usually collects in the hopper body during the course of operation. The openings 108, left in the hopper body by the struck-out portions 106, provide means for eliminating or draining such foreign matter from the hopper during operation. Openings 108 are large enough to pass such foreign matter but are smaller than workpieces 112 in order to contain the workpieces. Thus, struck-in portions 106 not only facilitate locating cover 104 on collector ring 100 but provide dirt elimination means for the hopper body.

I claim:

1. A rotary hopper comprising, a motor, a rotatable hopper body, and torque transmission means operably interposed between said motor and hopper body, said means including means forming a clutch having two members, means operably connecting one member to said motor and means operably connecting the other member to said hopper body, a plurality of individual single-convolution helical split rings, said rings being in stacked relation with their split portions in circumferential alignment so that the stack of rings forms an axially elongate single-convolution spring, adjustable means securing said spring in stressed condition, said spring in stressed condition being operative to urge said clutch members into clutching engagement, said adjustable means being operable selectively to regulate the stress of said spring, whereby to adjust said clutch for slipping when the torque transmitted from said motor to said hopper body exceeds a predetermined maximum.

2. A rotary hopper comprising a frame with a post thereon, a motor on said frame, a hollow cylindrical drive shaft rotatably mounted around said post, friction clutch means, said drive shaft being operably connected to said motor through said clutch means, said drive shaft having a plurality of circumferentially arranged axially extending bores therein, a plurality of bolts in said bores, a hopper body, at least one of said bolts securing said hopper body on said drive shaft, a plurality of individual single-convolution helical split rings, said rings being in stacked relation with their split portions in circumferential alignment so that they provide an axially elongate, single-convolution, open center spring, said spring being disposed in one of said bores, another of said bolts passing through the open center of said spring and being operative to secure said spring in stressed condition, said spring in stressed condition urging said clutch means toward engaged condition, said other bolt being turnable to regulate the stress of said spring, whereby to selectively adjust said clutch means to slip at a predetermined load, said hopper body having opening means aligned with said one bore to facilitate access thereto for adjusting said clutch means, a stationary baffle removably positioned in said hopper and over said opening means, and means securing said baffle to said post, the latter said means being detachable, whereby to remove said baffle for exposing said opening means and said other bolt.

References Cited in the file of this patent

UNITED STATES PATENTS

| | | |
|---|---|---|
| 786,306 | Neckerman | Apr. 4, 1905 |
| 1,210,238 | Walker et al. | Dec. 26, 1916 |
| 1,697,510 | Morin | Jan. 1, 1929 |
| 1,807,942 | Stimpson | June 2, 1931 |
| 1,842,243 | Boyer | Jan. 19, 1932 |
| 2,002,115 | Kjaer | May 21, 1935 |
| 2,025,273 | Dellaree | Dec. 24, 1935 |
| 2,060,182 | Dellaree | Nov. 10, 1936 |
| 2,153,160 | Seemel | Apr. 4, 1939 |
| 2,433,561 | Angell | Dec. 30, 1947 |
| 2,515,594 | Fischman | July 18, 1950 |
| 2,613,374 | Gora | Oct. 14, 1952 |
| 2,679,176 | Bruckman | May 25, 1954 |
| 2,683,531 | Baehr | July 13, 1954 |
| 2,757,822 | Cox | Aug. 7, 1956 |

FOREIGN PATENTS

| | | |
|---|---|---|
| 235,629 | Great Britain | June 18, 1925 |
| 497,753 | France | Sept. 24, 1919 |